United States Patent
Wu et al.

(10) Patent No.: US 12,211,985 B2
(45) Date of Patent: Jan. 28, 2025

(54) TEMPERATURE CONTROL ASSEMBLY AND BATTERY PACK

(71) Applicant: CONTEMPORARY AMPEREX TECHNOLOGY (HONG KONG) LIMITED, Hong Kong (CN)

(72) Inventors: Buwei Wu, Ningde (CN); Yincheng Huang, Ningde (CN); Yongqiang Su, Ningde (CN); Linggang Zhou, Nindge (CN); Fenggang Zhao, Nindge (CN); Songqiao Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 420 days.

(21) Appl. No.: 17/123,026

(22) Filed: Dec. 15, 2020

(65) Prior Publication Data
US 2021/0104789 A1    Apr. 8, 2021

Related U.S. Application Data

(63) Continuation of application No. PCT/CN2020/091302, filed on May 20, 2020.

(30) Foreign Application Priority Data

Jun. 18, 2019    (CN) .......................... 201910528793.7

(51) Int. Cl.
*H01M 10/6555* (2014.01)
*H01M 10/647* (2014.01)
(Continued)

(52) U.S. Cl.
CPC ..... *H01M 10/6555* (2015.04); *H01M 10/647* (2015.04); *H01M 10/6557* (2015.04); *H01M 50/209* (2021.01)

(58) Field of Classification Search
CPC ......... H01M 10/6551; H01M 10/6557; H01M 50/105; H01M 50/242; Y02E 60/10;
(Continued)

(56) References Cited

U.S. PATENT DOCUMENTS

| 7,682,732 B2 | 3/2010 | Kim et al. |
| 2005/0287426 A1 | 12/2005 | Kim et al. |

(Continued)

FOREIGN PATENT DOCUMENTS

| CN | 1713412 A | 12/2005 |
| CN | 103430302 A | 12/2013 |

(Continued)

OTHER PUBLICATIONS

Gahon et al., WO-2013127770 Machine Translation (Year: 2013).*
(Continued)

*Primary Examiner* — Ula C Ruddock
*Assistant Examiner* — Anna Korovina
(74) *Attorney, Agent, or Firm* — Kilpatrick Townsend & Stockton LLP

(57) ABSTRACT

The present application provides a temperature control assembly and a battery pack. The temperature control assembly includes a first side plate, a second side plate, and an elastic thermal pad. The elastic thermal pad has a main body that includes: a first plate section close to the first side plate in a longitudinal direction and extending in a vertical direction; a second plate section close to the second side plate in the longitudinal direction and extending in the vertical direction; and a connection section extending obliquely from the first side plate toward the second side plate and connected to the first and second plate sections. Due to elastic and structural characteristics of the elastic thermal pad, the main body of the elastic thermal pad is deformed under the action of extrusion to absorb the expan- (Continued)

sion forces of the batteries in time, thus greatly improving the service life of the batteries.

17 Claims, 12 Drawing Sheets

(51) Int. Cl.
*H01M 10/6557* (2014.01)
*H01M 50/209* (2021.01)

(58) Field of Classification Search
CPC ...... F28F 3/12; F28F 3/025; F28F 1/40; F28F 3/00; B21C 37/151; F28D 9/0062
See application file for complete search history.

(56) References Cited

U.S. PATENT DOCUMENTS

| | | | |
|---|---|---|---|
| 2009/0014164 A1* | 1/2009 | Zobel | B21C 37/151 165/177 |
| 2011/0052960 A1 | 3/2011 | Kwon et al. | |
| 2011/0293982 A1 | 12/2011 | Martz et al. | |
| 2017/0144212 A1* | 5/2017 | Moreau | B21C 37/225 |

FOREIGN PATENT DOCUMENTS

| | | | | |
|---|---|---|---|---|
| CN | 105552268 A | 5/2016 | | |
| CN | 106025130 A | 10/2016 | | |
| CN | 107437594 A | 12/2017 | | |
| CN | 207967120 U | 10/2018 | | |
| CN | 109473583 A | 3/2019 | | |
| CN | 204809210 U | 3/2019 | | |
| EP | 3125332 A1 * | 2/2017 | .......... B60L 11/1864 | |
| JP | H0199093 A | 4/1989 | | |
| JP | 2000048867 A | 2/2000 | | |
| JP | 2003007355 A | 1/2003 | | |
| JP | 2005302502 A * | 10/2005 | | |
| JP | 2007165698 A | 6/2007 | | |
| JP | 2008124033 A | 5/2008 | | |
| JP | 2009524000 A | 6/2009 | | |
| JP | 2009174843 A | 8/2009 | | |
| JP | 2011243358 A | 12/2011 | | |
| JP | 2012248374 A | 12/2012 | | |
| JP | 2014157721 A | 8/2014 | | |
| JP | 2019046578 A | 3/2019 | | |
| KR | 1020110024954 A | 3/2011 | | |
| TW | M367989 U | 11/2009 | | |
| WO | WO-2013127770 A1 * | 9/2013 | .......... B21C 37/151 | |
| WO | WO2017124124 A1 | 7/2017 | | |

OTHER PUBLICATIONS

Okazaki et al., JP 2005302502 (Year: 2005).*
Kiba JP 2000-048867 Machine Translation (Year: 2000).*
Contemporary Amperex Technology Co., Limited, Extended European Search Report, EP20815703.2, Sep. 10, 2021, 9 pgs.
Contemporary Amperex Technology Co., Limited, International Search Report and Written Opinion, PCT/CN2020091302, Aug. 13, 2020, 13 pgs.
Contemporary Amperex Technology Co., Limited, First Office Action, CN201910528793.7, May 8, 2021, 13 pgs.
Notification to Grant Patent Right for Invention received in corresponding Chinese Application 201910528793.7, mailed Sep. 15, 2021.
Notice of Reasons for Refusal received in corresponding Japanese Application 2021-575016, mailed Jan. 23, 2023.
Notice of Reasons for Refusal received in corresponding Japanese Application 2021-575016, mailed Jul. 3, 2023.
Request for the Submission of an Opinion received in corresponding Korean Application 10-2021-7040607, mailed on Feb. 28, 2024.
Decision to Grant a Patent received in corresponding Japanese Application 2021-575016, mailed on Dec. 18, 2023.

* cited by examiner

TEMPERATURE CONTROL ASSEMBLY AND BATTERY PACK

CROSS-REFERENCE TO RELATED APPLICATIONS

This application is a continuation application of PCT Patent Application No. PCT/CN2020/091302, entitled "TEMPERATURE CONTROL ASSEMBLY AND BATTERY PACK" filed on May 20, 2020, which claims priority to Chinese Patent Application No. 201910528793.7, filed on Jun. 18, 2019 and entitled "TEMPERATURE CONTROL ASSEMBLY AND BATTERY PACK", both of which are incorporated herein by reference in their entirety.

TECHNICAL FIELD

The present application relates to the field of battery technologies, and in particular, to a temperature control assembly and a battery pack.

BACKGROUND

A battery pack usually includes a plurality of batteries in groups. In the group technology, in addition to ensuring strength and performance of a structure, an effect of the structure on the battery life should be considered. Temperature and expansion force have a great impact on the battery life, and thus heat management and expansion force must be considered during design.

At present, there are two major methods of heat management design: water cooling and air cooling. Because of high costs of the water cooling, air cooling is widely used in the battery pack.

In terms of expansion force design, during charge and discharge of the battery pack, the batteries will gradually expand and interact with a fixed structure (that is, generate an expansion force). A proper expansion force will benefit reaction of the batteries, but an excessive expansion force will make the battery overpressure and lead to lithium precipitation and even irreversible capacity loss, thus greatly reducing the battery life.

In order to alleviate the expansion force, the following methods are mainly used at present: (i) The batteries are directly attached to each other to strengthen the external structure, so as to directly resist the expansion force. The deficiency of this method is that when battery capacity and a quantity of series of batteries gradually increase, the expansion force of the battery group will increasingly larger, thus reducing the battery life. (ii) A structure such as a cushion pad is added between the batteries to absorb the expansion force through the material's own expansion and contraction characteristics, thus reducing the expansion force of the grouped batteries. The deficiency of this method is that large surfaces of the batteries are close to the cushion pad, and only side and bottom of the batteries can be used to dissipate heat, thereby reducing heat dissipation efficiency. (iii) The batteries are separated from each other with gaps to allow the batteries to expand freely. The deficiency of this method is that the batteries expand freely at the beginning, and it is easy to react insufficiently under no pressure, which reduces the service life. In addition, if the batteries expand greatly and the reserved gaps are too large, a group volume will be affected.

SUMMARY

In view of the problems in the background, an objective of the present application is to provide a temperature control assembly and a battery pack. When the temperature control assembly is applied to the battery pack, the temperature control assembly can not only perform thermal management on batteries, but also absorb expansion forces generated by the batteries, thereby reducing deformation of the batteries under the effect of the expansion force and greatly improving service life of the batteries.

To achieve the foregoing objective, the present application provides a temperature control assembly, including a first side plate; a second side plate, disposed relative to the first side plate along a longitudinal direction, where the second side plate is connected to the first side plate and forms a cavity together with the first side plate; and an elastic thermal pad, disposed in the cavity to divide the cavity into a plurality of passages. The elastic thermal pad has a main body, and the main body includes: a first plate section, configured to be close to the first side plate in the longitudinal direction and extend in a vertical direction; a second plate section, configured to be close to the second side plate in the longitudinal direction and extend in the vertical direction; and a connection section, configured to extend obliquely from the first side plate toward the second side plate and be connected to the first plate section and the second plate section.

In some embodiments of the present application, the first plate section is in contact with the first side plate, and the second plate section is in contact with the second side plate.

In some embodiments of the present application, the first side plate has a first body, configured to extend in the vertical direction; and a first extension portion, configured to be connected to one end of the first body and extend in the longitudinal direction, where the first extension portion is connected to the second side plate.

In some embodiments of the present application, the elastic thermal pad is movably disposed in the cavity formed by the second side plate and the first side plate. Alternatively, two ends of the elastic thermal pad in the vertical direction are respectively abutted against corresponding first extension portions of the first side plate.

In some embodiments of the present application, the elastic thermal pad further has a compression portion, configured to be connected to one end, in the vertical direction, of the main body. The compression portion is disposed so that when the first plate section and the second plate section of the main body are compressed by the first side plate and the second side plate in the longitudinal direction, the compression portion is compressed by the main body and deformed.

In some embodiments of the present application, the compression portion is formed as a winding structure. When the first plate section and the second plate section of the main body are compressed by the first side plate and the second side plate in the longitudinal direction, the compression portion is abutted against the first extension portion of the first side plate in the vertical direction and the main body is wound around the compression portion to compress the compression portion.

In some embodiments of the present application, the compression portion is formed as an arch structure. The elastic thermal pad further has a connecting portion, configured to be located between the compression portion and the first extension portion in the vertical direction and connected to the compression portion. When the main body is compressed by the first side plate and the second side plate in the longitudinal direction, the connecting portion abuts against the first extension portion of the first side plate, and the first extension portion compresses the compression portion together with the main body via the connecting portion.

In some embodiments of the present application, the compression portion includes: a third plate section, configured to extend in the vertical direction and be spaced from the first side plate and the second side plate in the longitudinal direction; a first extrusion section, configured to extend obliquely from the third plate section toward the first side plate and be connected to the third plate section and the main body; and a second extrusion section, configured to extend obliquely from the third plate section toward the first side plate and be connected to the third plate section and the connecting portion.

In some embodiments of the present application, there is one elastic thermal pad.

In some embodiments of the present application, there are at least two elastic thermal pads, and the at least two elastic thermal pads include a first elastic thermal pad and a second elastic thermal pad. The temperature control assembly further includes a partition plate, configured to extend in the longitudinal direction and be connected to the first side plate and the second side plate. The first elastic thermal pad is disposed above the partition plate, and the second elastic thermal pad is disposed below the partition plate.

The present application further provides a battery pack including a plurality of batteries and the temperature control assembly mentioned above, where the plurality of batteries includes a first battery and a second battery, and the temperature control assembly is disposed between the first battery and the second battery.

The present application further provides an apparatus including the battery pack mentioned above, where the battery pack is configured to provide electrical energy.

The beneficial effects of the present application are as follows:

In the battery pack of the present application, when external air flows through passages of the temperature control assembly, heat dissipation treatment of batteries can be implemented. In addition, during use of the battery pack, the batteries will generate expansion forces. In this case, expansion forces of two adjacent batteries are respectively applied to the first side plate and the second side plate, and the first side plate and second side plate respectively compress the first plate section and the second plate section of the main body in the longitudinal direction. Due to elastic and structural characteristics of the elastic thermal pad, the main body of the elastic thermal pad is deformed under the action of extrusion of the first side plate and the second side plate to absorb the expansion forces of the batteries in time, thereby reducing the degree of deformation of the batteries under the expansion forces, and thus service life of the batteries is greatly improved.

Figure 1:
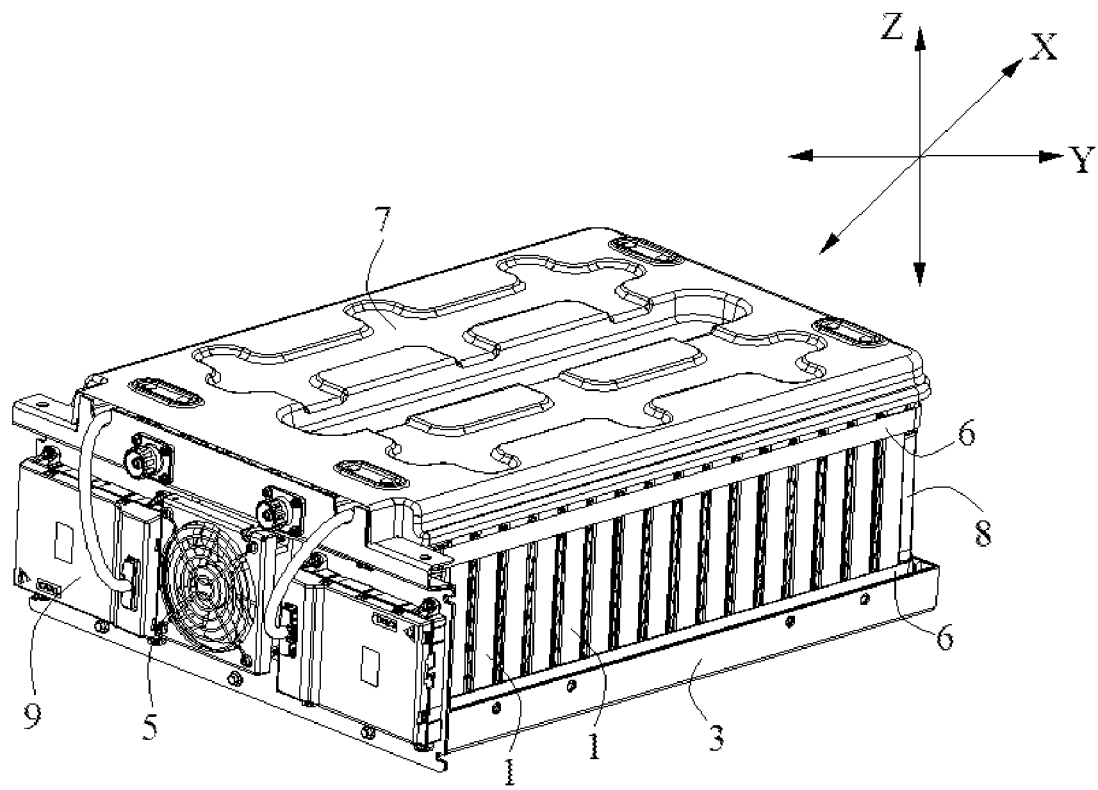
FIG. 1 is a schematic structural diagram of a battery pack according to the present application.

Reference numerals in the accompanying drawings are described as follows:
1. battery;
1A. first battery;
1B. second battery;
2. temperature control assembly;
21. first side plate;
211. first body;
212. first extension portion;
22. second side plate;
221. second body;
222. second extension portion;
23. elastic thermal pad;
231. main body;
231A. first plate section;
231B. second plate section;
231C. connection section;
232. compression portion;
232A. third plate section;
232B. first extrusion section;
232C. second extrusion section;
233. connecting portion;
24. partition plate;
3. lower case;
4. air duct assembly;
41. air volume control plate;
42. first support plate;
43. second support plate;
44. mounting plate;
45. sealing strip;
5. fan;
6. strap;
7. upper cover;
8. end plate;
F. passage;
X. horizontal direction;
Y. longitudinal direction; and
Z. vertical direction.

DESCRIPTION OF EMBODIMENTS

To make the objectives, technical solutions, and advantages of this application clearer, this application is further described below in detail with reference to the accompanying drawings and the embodiments. It should be understood that the embodiments described in this specification are merely intended to explain this application, but not to limit this application.

In the descriptions of this application, unless otherwise specified and defined explicitly, the terms "first" and "second" are merely intended for a purpose of description, and should not be understood as an indication or implication of relative importance, and the term "a plurality of" means two or more than two (including two). Unless otherwise specified, the term "connection" should be understood in a general sense. For example, the "connection" may be a fixed connection, a detachable connection, an integrated connection, an electrical connection or a signal connection; or may be a direct connection, or an indirect connection through an intermediate medium. A person of ordinary skill in the art can understand specific meanings of the foregoing terms in this application according to a specific situation.

In the descriptions of this specification, it should be understood that the directional terms such as "up" and "down" described in the embodiments of this application are described as seen from the angles shown in the accompanying drawings, and should not be understood as a limitation to the embodiments of this application. The following further describes this application in detail with reference to the embodiments and accompanying drawings.

Referring to FIG. 1 to FIG. 13, a battery pack of this application includes a plurality of batteries 1, a temperature control assembly 2, a lower case 3, an air duct assembly 4, a fan 5, a strap 6, an upper cover 7, an end plate 8, a mounting plate 9, and a harness separator (not shown).

Figure 2:
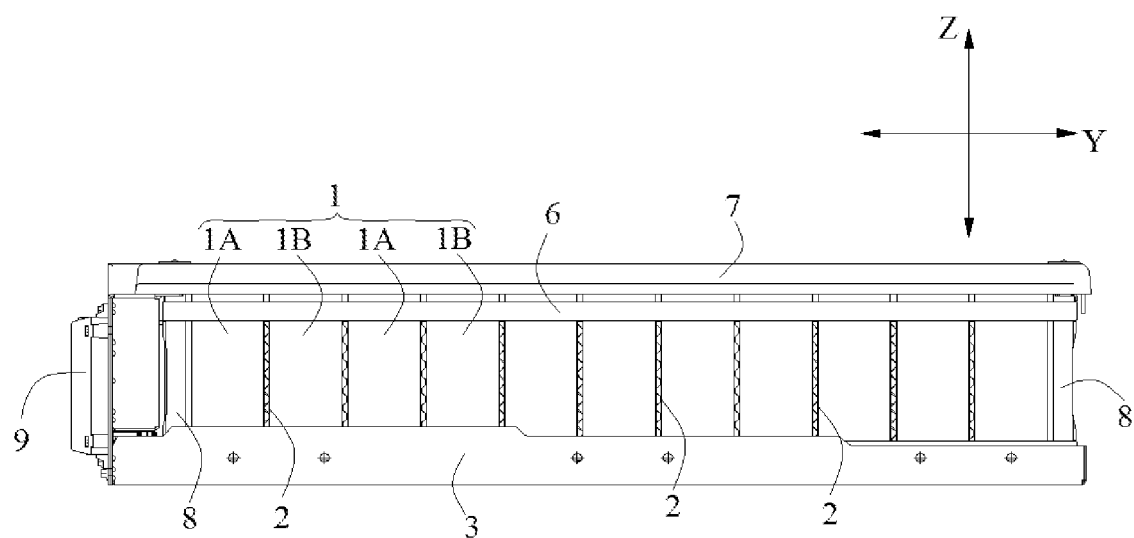
FIG. 2 is a top view of the battery pack shown in FIG. 1 after the upper cover is removed.
Figure 3:
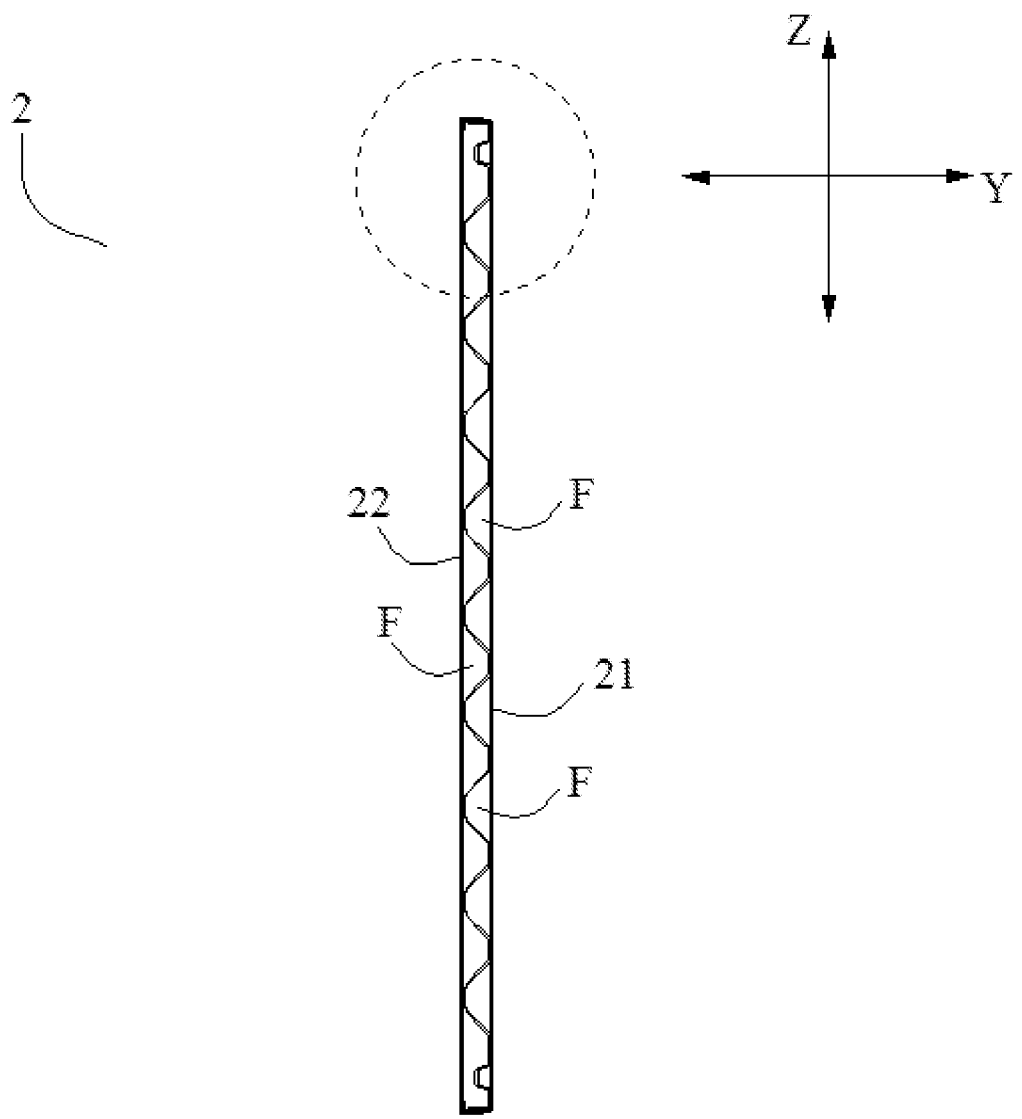
FIG. 3 is a schematic structural diagram of a temperature control assembly according to an embodiment of the present application.
Figure 4:
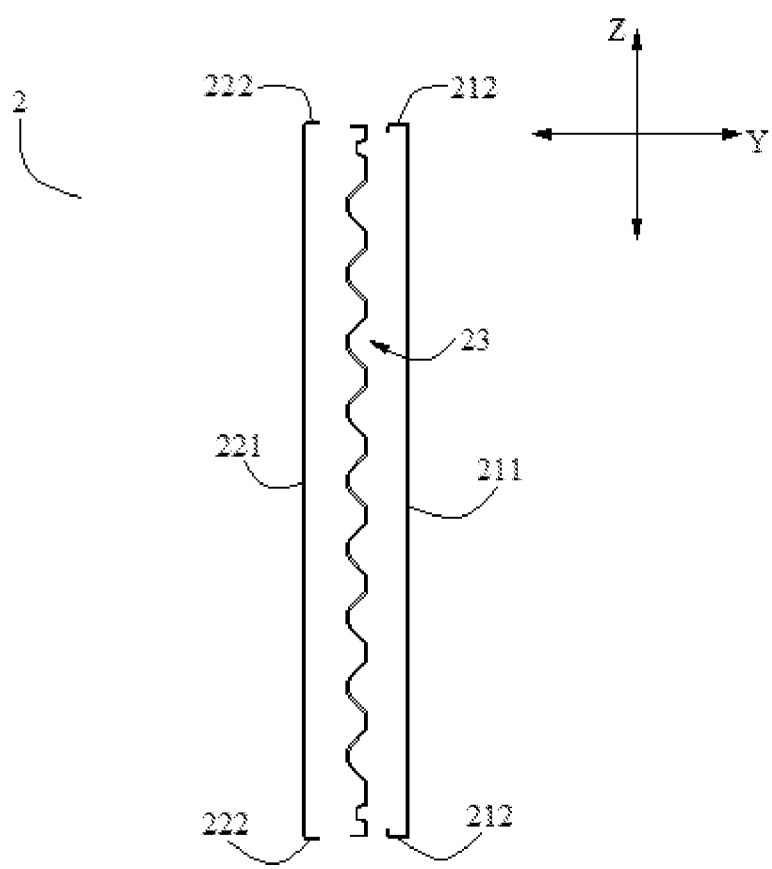
FIG. 4 is an exploded diagram of FIG. 3.

Referring to FIG. 1 and FIG. 2, the plurality of batteries 1 includes a first battery 1A and a second battery 1B, and the temperature control assembly 2 is disposed between the first battery 1A and the second battery 1B. Further, there may be a plurality of first batteries 1A and a plurality of second batteries 1B, the plurality of first batteries 1A and the plurality of second batteries 1B are arranged alternately in a longitudinal direction Y, and a temperature control assembly 2 may be disposed between each adjacent first battery 1A and second battery 1B.

To ensure strength and thermal conductivity of the temperature control assembly 2, the temperature control assembly 2 can be made of metal material, such as aluminum profile.

Referring to FIG. 3 to FIG. 12, the temperature control assembly 2 may include a first side plate 21, a second side plate 22, an elastic thermal pad 23, and a partition plate 24.

The first side plate 21 is disposed relative to the second side plate 22 along the longitudinal direction Y, and the second side plate 22 is connected to the first side plate 21 and forms a frame structure with a cavity together with the first side plate 21.

The first side plate 21 may have a first body 211, configured to extend in a vertical direction (Z); and a first extension portion 212, configured to be connected to one end of the first body 211 and extend in the longitudinal direction (Y), where the first extension portion 212 is connected to the second side plate 22. A quantity of the first extension portions 212 is optionally one (that is, the first side plate 21 is an L-shaped structure) or two (that is, the first side plate 21 is a ]-shaped structure).

The second side plate 22 may be a flat structure as a whole (not shown). Alternatively, the second side plate 22 may have a second body 221, configured to extend in the vertical direction Z; and a second extension portion 222, configured to be connected to one end of the second body 221 and extend in the longitudinal direction Y, where the second extension portion 222 is connected to the first side plate 21. The second extension portion 222 is alternatively set to one or two in quantity.

When a quantity of the first extension portions 212 and second extension portions 222 are both two, each of the first extension portion 212 and the corresponding second extension portion 222 are superposed and fixedly connected in the vertical direction Z.

The first body 211 of the first side plate 21 and the second body 221 of the second side plate 22 are disposed directly facing a large surface of a corresponding battery 1. When external air flows through passages F of the temperature control assembly 2, heat dissipation treatment of batteries 1 can be implemented.

The elastic thermal pad 23 is disposed in a cavity formed by the first side plate 21 and the second side plate 22 to divide the cavity into a plurality of passages F. Specifically, the elastic thermal pad 23 may be movably disposed in the cavity formed by the second side plate 22 and the first side plate 21. Alternatively, two ends of the elastic thermal pad 23 in the vertical direction Z are respectively abutted against corresponding first extension portions 212 of the first side plate 21.

The elastic thermal pad 23 has a main body 231, and the main body 231 includes: a first plate section 231A, configured to be close to the first side plate 21 in the longitudinal direction Y and extend in the vertical direction Z; a second plate section 231B, configured to be close to the second side plate 22 in the longitudinal direction Y and extend in the vertical direction Z; and a connection section 231C, configured to extend obliquely from the first side plate 21 toward the second side plate 22 and be connected to the first plate section 231A and the second plate section 231B. In this case, the first plate section 231A, the connection section 231C and the second side plate 22 form a corresponding passage F, and the second plate section 231B, the connection section 231C and the first side plate 21 also form a corresponding passage F.

It should be noted that "a first plate section 231A, configured to be close to the first side plate 21 in the longitudinal direction Y" herein includes two setting manners: (i) The first plate section 231A is disposed in contact with the first side plate 21. (ii) The first plate section 231A is separated from the first side plate 21 by a certain distance, and an interval between the first plate section 231A and the first side plate 21 is smaller than an interval between the first plate section 231A and the second side plate 22.

Similarly, "a second plate section 231B, configured to be close to the second side plate 22 in the longitudinal direction Y" also includes two setting manners: (i) The second plate section 231B is disposed in contact with the second side plate 22. (ii) The second plate section 231B is separated from the second side plate 22 by a certain distance, and an interval between the second plate section 231B and the second side plate 22 is smaller than an interval between the second plate section 231B and the first side plate 21.

During use of the battery pack, the batteries 1 will generate expansion forces. In this case, expansion forces of two adjacent batteries 1 (namely, a first battery 1A and a second battery 1B) are respectively applied to the first side plate 21 and the second side plate 22, and the first side plate 21 and second side plate 22 respectively compress the first plate section 231A and the second plate section 231B of the main body 231 in the longitudinal direction Y. Due to elastic and structural characteristics of the elastic thermal pad 23, the main body 231 of the elastic thermal pad 23 is deformed under the action of extrusion of the first side plate 21 and the second side plate 22 to absorb the expansion forces of the batteries 1 in time, thereby reducing the degree of deformation of the batteries 1 under the expansion forces, and thus service life of the batteries 1 is greatly improved.

Figure 6:
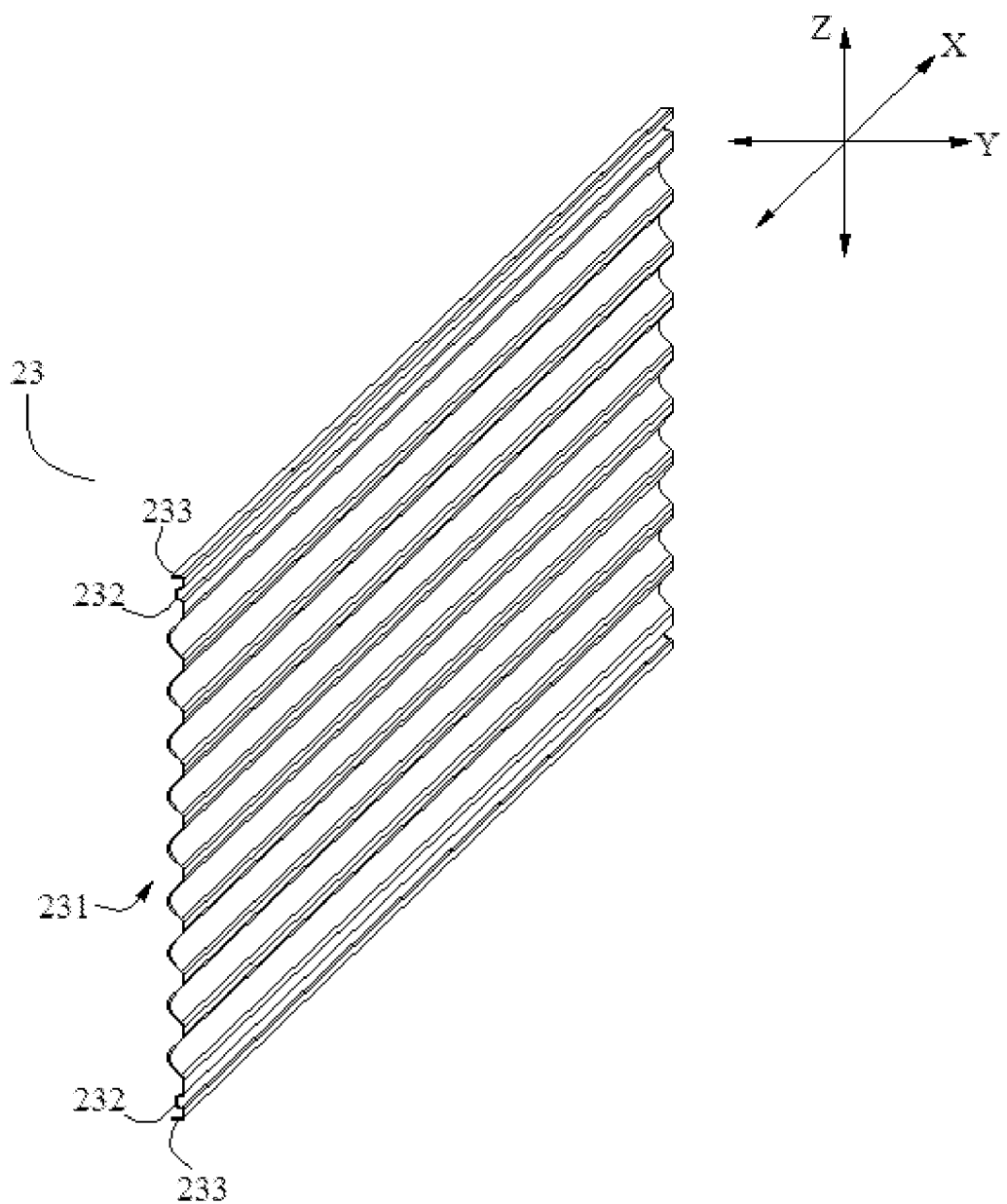
FIG. 6 is a three-dimensional diagram of the elastic thermal pad of FIG. 4.
Figure 7:
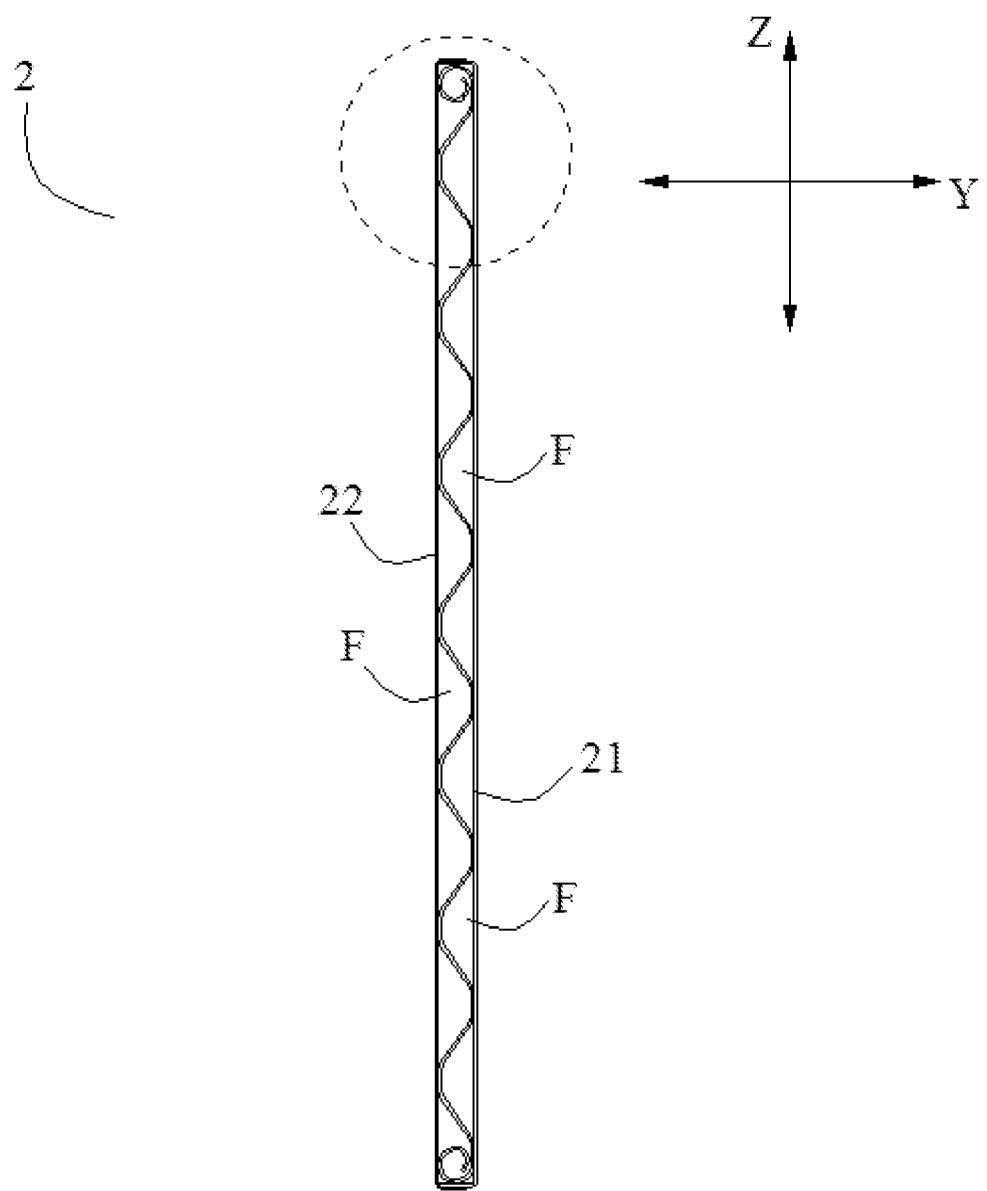
FIG. 7 is a schematic structural diagram of a temperature control assembly according to another embodiment of the present application.
Figure 8:
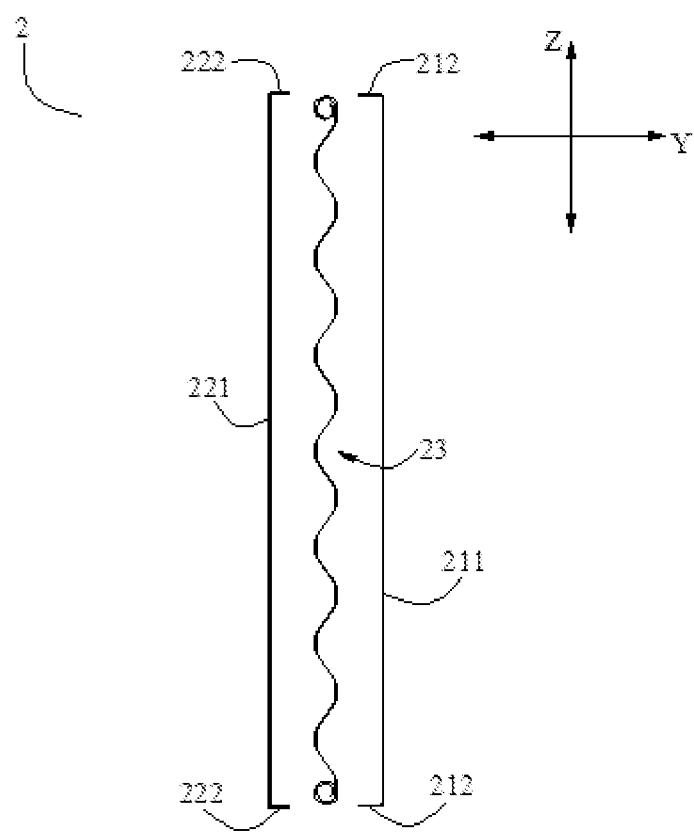
FIG. 8 is an exploded diagram of FIG. 7.
Figure 9:
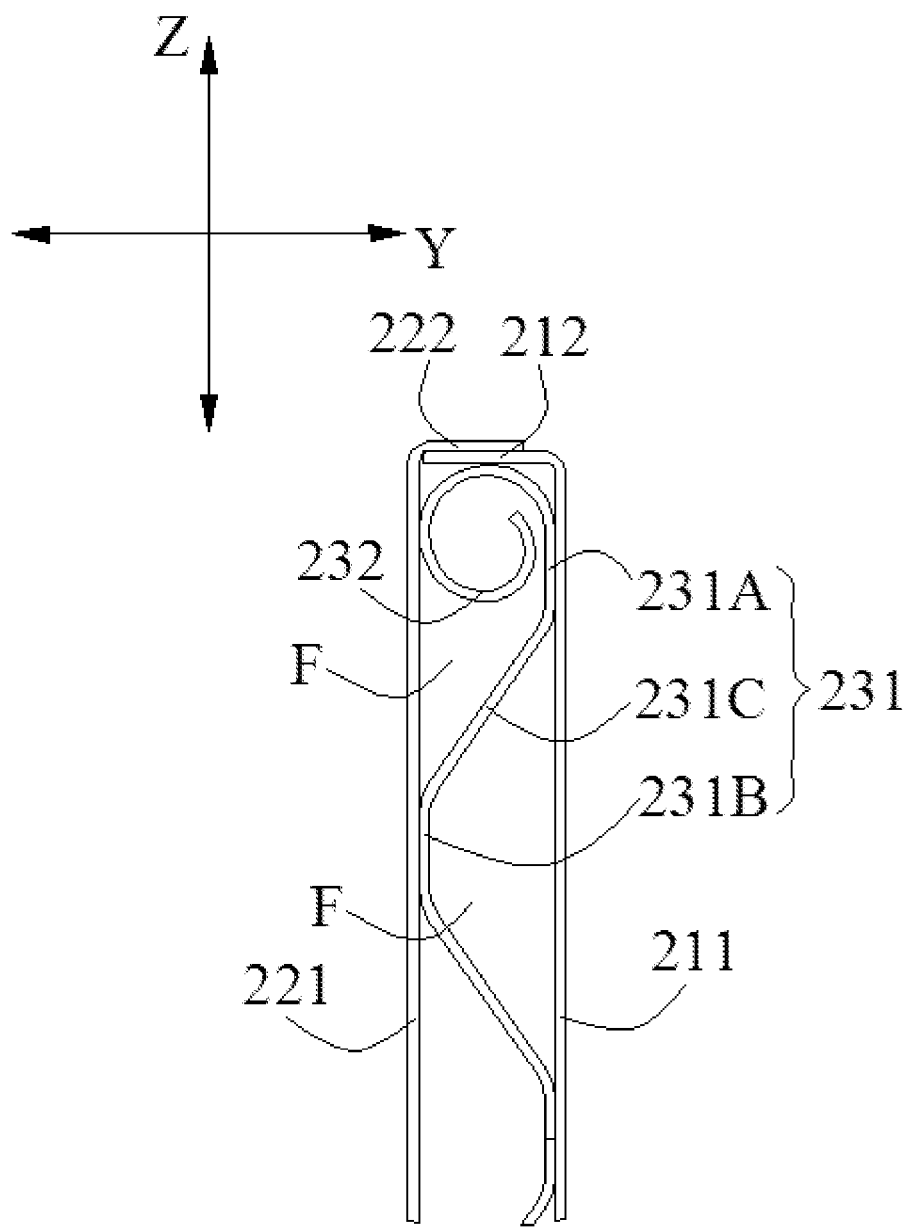
FIG. 9 is an enlarged view of the circle portion in FIG. 7, where a first compression portion is in an uncompressed state.
Figure 10:
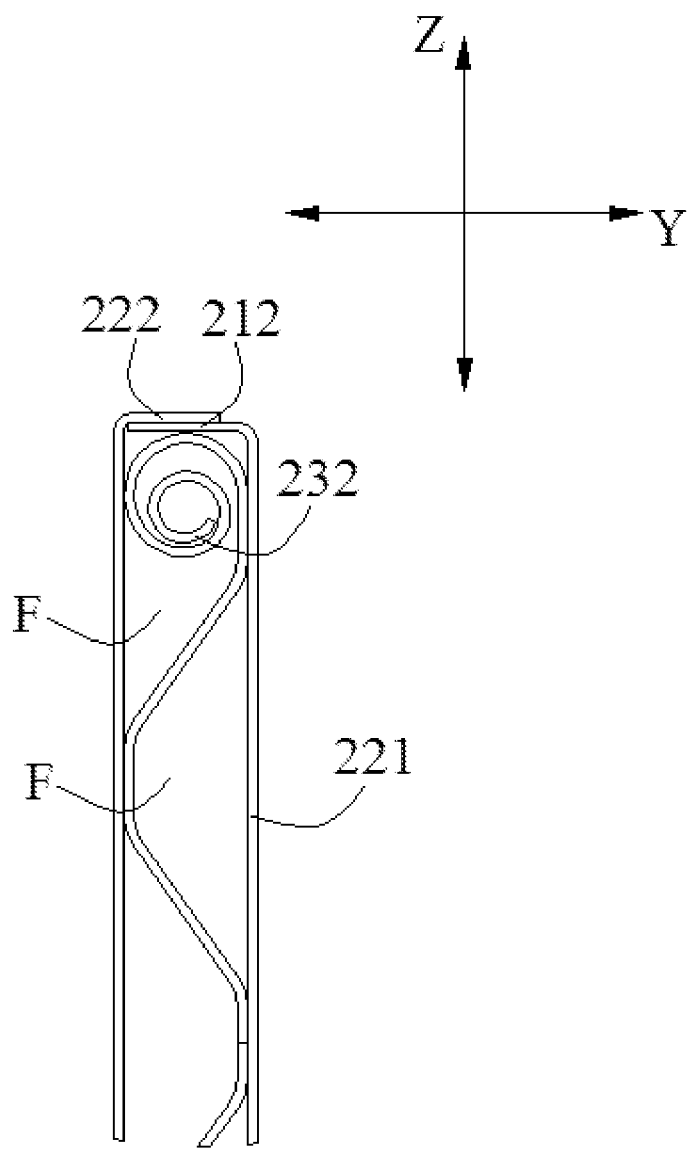
FIG. 10 is an enlarged view of the circle portion in FIG. 7, where a first compression portion is in a compressed state.
Figure 11:
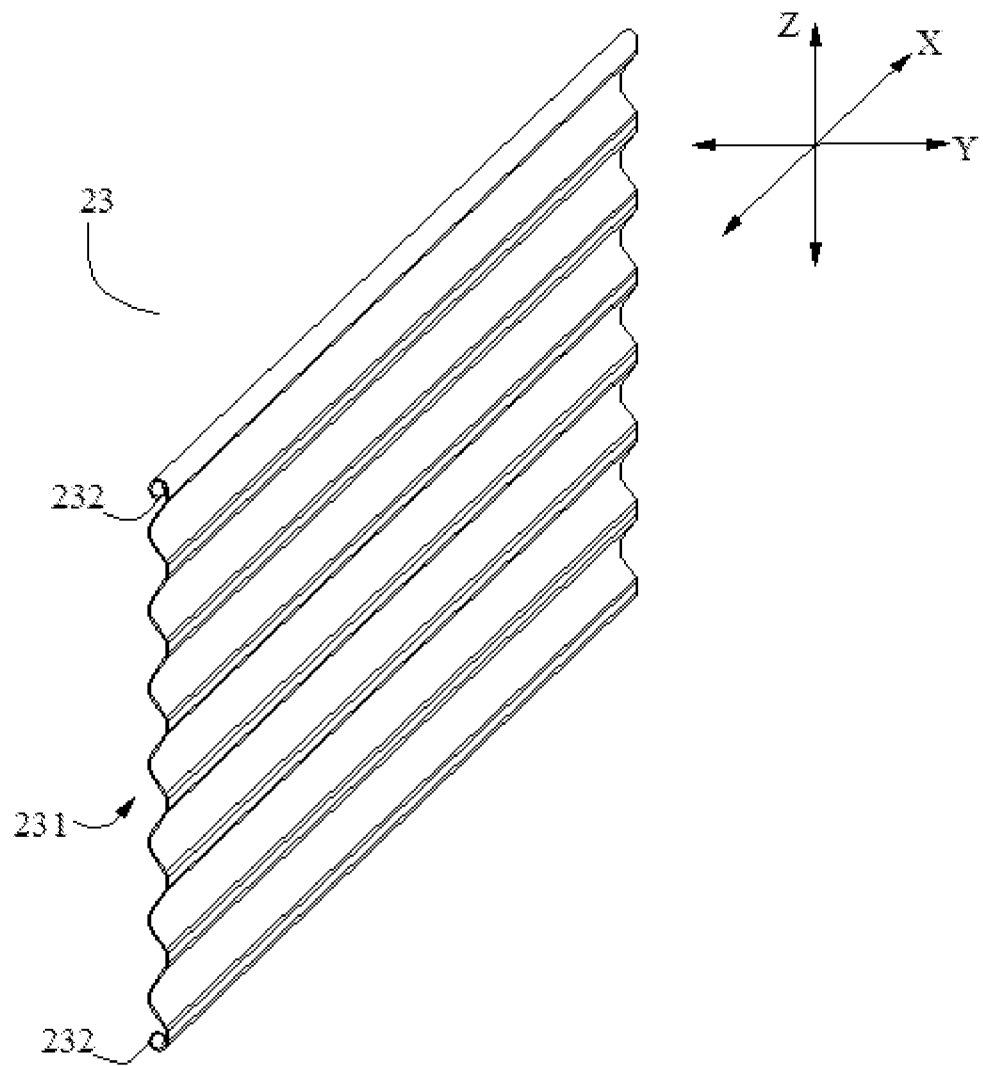
FIG. 11 is a three-dimensional diagram of the elastic thermal pad of FIG. 8.

Referring to FIG. 6 and FIG. 11, the body 231 of the elastic thermal pad 23 may include a plurality of first plate sections 231A, a plurality of second plate sections 231B and a plurality of connection sections 231C, and adjacent first plate section 231A and second plate section 231B are connected by a corresponding connection section 231C. Thus, the plurality of first plate sections 231A, the plurality of second plate sections 231B and the plurality of connection sections 231C together form a wave-like structure (also referred to as a corrugated plate structure). This wave-like structure makes a contact area between the air and the elastic thermal pad 23 large, thus improving heat dissipation efficiency of the temperature control assembly 2 to the batteries 1.

The elastic thermal pad 23 may further have a compression portion 232, configured to be connected to one end, in the vertical direction Z, of the main body 231. There may be two compression portions 232, and the two compression portions 232 are respectively connected to two ends, in the vertical direction Z, of the main body 231. The compression portion 232 is disposed so that when the first plate section 231A and the second plate section 231B of the main body 231 are compressed by the first side plate 21 and the second side plate 22 in the longitudinal direction Y, the compression portion 232 is compressed by the main body 231 and deformed.

In a first embodiment, referring to FIG. 7 to FIG. 11, the compression portion 232 of the elastic thermal pad 23 may be formed as a winding structure (a cavity is formed). When the first plate section 231A and the second plate section 231B of the main body 231 are compressed by the first side plate 21 and the second side plate 22 in the longitudinal direction Y, the main body 231 extends in the vertical direction Z and the compression portion 232 abuts against the first extension portion 212 of the first side plate 21. In this case, an elongated portion of the main body 231 wraps around the compression portion 232 and compresses the compression portion 232. The compression portion 232 is deformed to provide sufficient space for the elongated portion of the main body 231, and thus a purpose of absorbing the expansion forces of the batteries 1 is achieved.

In the first embodiment, both ends of the elastic thermal pad 23 need to have sufficient mobility, and thus there is no need for a fixed connection between the compression portion 232 and the first extension portion 212 of the first side plate 21. A portion of the first plate section 231A of the main body 231 can be bonded to the first side plate 21 and a portion of the second plate section 231B of the main body 231 can be bonded to the second side plate 22. In some embodiments, the first plate section 231A located in the middle in the vertical direction Z is bonded to the first side plate 21, and the second plate section 231B located in the middle in the vertical direction Z is bonded to the second side plate 22.

In a second embodiment, referring to FIG. 3 to FIG. 6, the compression portion 232 of the elastic thermal pad 23 may be formed as an arch structure (a cavity is formed). The elastic thermal pad 23 further has a connecting portion 233, configured to be located between the compression portion 232 and the first extension portion 212 in the vertical direction Z and connected to the compression portion 232. When the first plate section 231A and the second plate section 231B of the main body 231 are compressed by the first side plate 21 and the second side plate 22 in the longitudinal direction Y, the main body 231 extends in the vertical direction Z and the connecting portion 233 abuts against the first extension portion 212 of the first side plate 21, and the first extension portion 212 compresses the compression portion 232 together with the main body 231 via the connecting portion 233. The compression portion 232 is deformed to provide sufficient space for the elongated portion of the main body 231, and thus a purpose of absorbing the expansion forces of the batteries 1 is achieved.

Specifically, the compression portion 232 may include: a third plate section 232A, configured to extend in the vertical direction Z and be spaced from the first side plate 21 and the second side plate 22 in the longitudinal direction Y; a first extrusion section 232B, configured to extend obliquely from the third plate section 232A toward the first side plate 21 and be connected to the third plate section 232A and the main body 231; and a second extrusion section 232C, configured to extend obliquely from the third plate section 232A toward the first side plate 21 and be connected to the third plate section 232A and the connecting portion 233.

Figure 5:
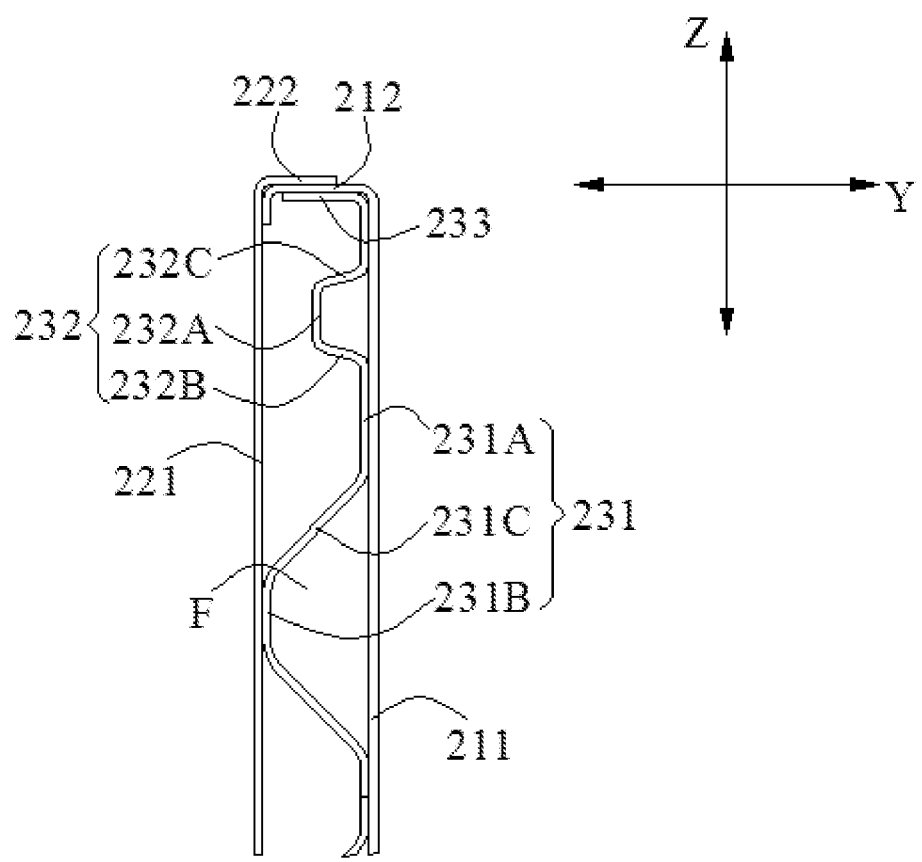
FIG. 5 is an enlarged view of the circle portion in FIG. 3.

The connecting portion 233 may be formed as an L-shaped structure, as shown in FIG. 5.

In the second embodiment, the connecting portion 233 of the elastic thermal pad 23 may be directly fixed to the first extension portion 212, and other portions of the elastic thermal pad 23 and the first side plate 21 and the second side plate 22 do not need to be fixed.

Figure 12:
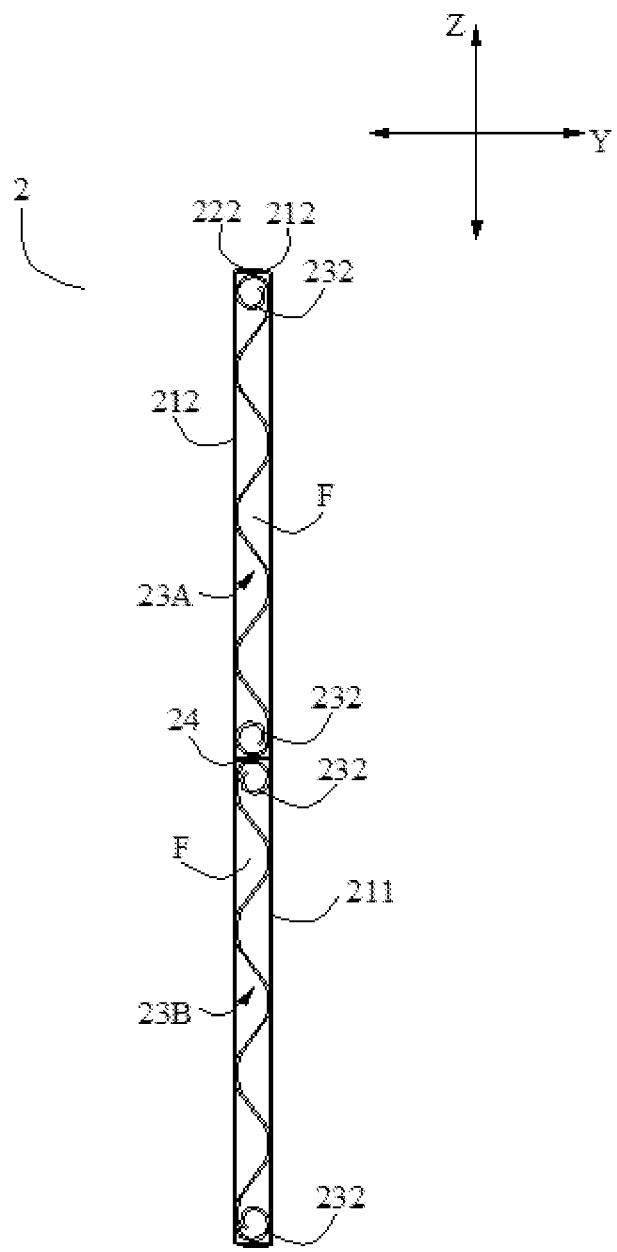
FIG. 12 is a schematic structural diagram of a temperature control assembly according to yet another embodiment of the present application.

A quantity of elastic thermal pad 23 can be selectively set according to actual use. Specifically, referring to FIG. 3 to FIG. 5 and FIG. 7 to FIG. 10, there may be one elastic thermal pad 23. Referring to FIG. 12, there may be at least two elastic thermal pads 23, and the at least two elastic thermal pads 23 include a first elastic thermal pad 23A and a second elastic thermal pad 23B. The partition plate 24 is configured to extend in the longitudinal direction Y and be connected to the first side plate 21 and the second side plate 22. The first elastic thermal pad 23A is disposed above the partition plate 24, and the second elastic thermal pad 23B is disposed below the partition plate 24.

Referring to FIG. 1 and FIG. 2, the lower case 3 is configured to support the plurality of batteries 1. The plurality of batteries 1 may be arranged in at least two rows of battery rows in a horizontal direction X, and the air duct assembly 4 is disposed between the two rows of battery rows and fixed to the lower case 3. The air duct assembly 4 and a corresponding battery row form an air duct, and the air duct is connected to a plurality of passages F and the fan 5 of a corresponding temperature control assembly 2.

Figure 13:
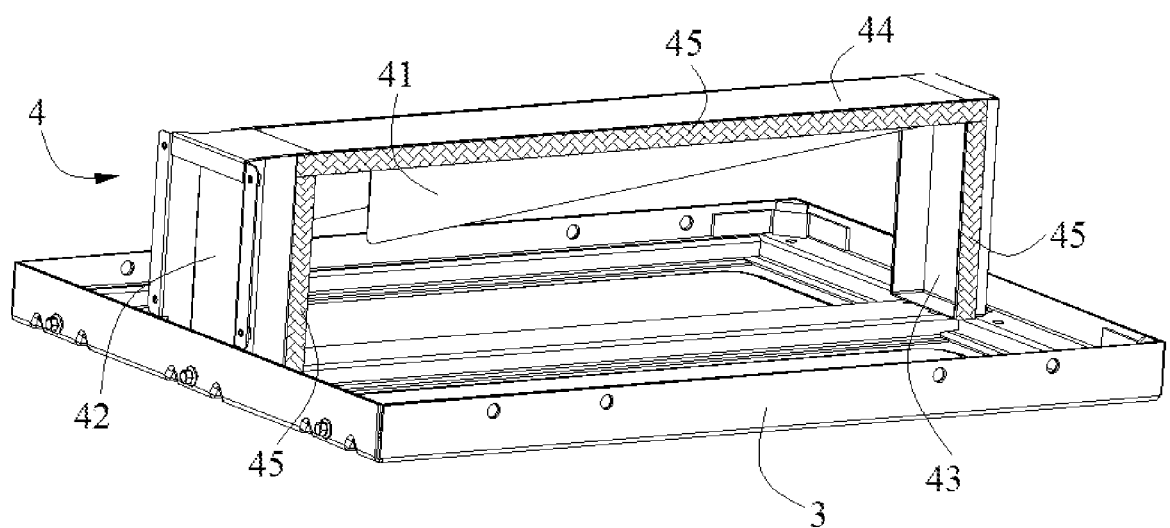
FIG. 13 is an assembly diagram of an air duct assembly and a lower case.

Referring to FIG. 13, the air duct assembly 4 may include an air volume control plate 41, a first support plate 42, a second support plate 43, a mounting plate 44, and a sealing strip 45.

The air volume control plate 41 is disposed in the air duct, the first support plate 42 and the second support plate 43 are disposed at an interval in the longitudinal direction Y, and the first support plate 42 is close to the fan 5. A height of the air volume control plate 41 decreases sequentially along a direction of the first support plate 42 toward the second support plate 43, so that the air duct expands from a side close to the fan 5 to a side away from the fan 5 in the longitudinal direction Y.

The mounting plate 44 extends along the longitudinal direction Y and is connected to the first support plate 42 and the second support plate 43, and the air volume control plate 41 is fixed to the mounting plate 44. The sealing strip 45 is disposed on the first support plate 42, the second support plate 43 and the mounting plate 44. When the air duct assembly 4 and a plurality of batteries 1 are assembled, the sealing strip 45 is bonded to a corresponding battery row to be hermetically connected with the battery row.

During use of a battery pack, under an action of the fan 5, external air can enter the plurality of passages F of the temperature control assembly 2 to implement heat dissipation of the batteries 1. In addition, based on setting of the air volume control plate 41, the amount of external air entering into different temperature control assemblies 2 is different, thus implementing uniform heat dissipation for all batteries 1.

Referring to FIG. 1, the end plate 8 is disposed at both ends of each battery row in the longitudinal direction Y. The strap 6 tightens circumferentially all corresponding batteries 1 in a battery row, corresponding temperature control assembly 2, and corresponding two end plates 8. The mounting plate 9 is located on the outside of a corresponding end plate 8 in the longitudinal direction Y, is fixedly connected to the lower case 3 and the corresponding end plate 8, and is fixedly mounted with the fan 5.

The harness separator is disposed above the plurality of batteries 1 and is directly fixed to the end plate 8, thereby helping to improve grouping efficiency and integration degree of the battery pack. Referring to FIG. 1 and FIG. 2, the upper cover 7 is disposed above the harness separator and fixedly connected to the harness separator by using a fastener (for example, a rivet). Herein because there is no clasp on the peripheral side of the upper cover 7, it can be directly processed by using suction molding technology, thus reducing processing costs.

An embodiment of this application further provides an apparatus, including the battery pack in the foregoing embodiment. The battery pack is configured to provide electrical energy. The apparatus includes but is not limited to a vehicle, a ship, an energy storage cabinet or an aircraft, where the vehicle may be a new energy vehicle, such as a battery electric vehicle, a hybrid electric vehicle, or an extended-range electric vehicle.

What is claimed is:

1. A temperature control assembly disposed in a battery pack, the temperature control assembly comprising:
   a first side plate abutting a first battery of the battery pack, the first side plate comprises a first body, configured to extend in a vertical direction; and two first extension portions, each of the first extension portions is configured to be connected to one end of the first body and extend in a longitudinal direction;
   a second side plate abutting a second battery of the battery pack, disposed relative to the first side plate along a longitudinal direction of the temperature control assembly, wherein the second side plate is connected to the first side plate and forms a cavity together with the first side plate; and
   at least one elastic thermal pad, movably disposed in the cavity to divide the cavity into a plurality of passages, wherein
   the elastic thermal pad comprises a main body, and the main body comprises:
   a first plate section, configured to be close to the first side plate in the longitudinal direction and extend in a vertical direction of the temperature control assembly, wherein the first plate section is distanced from the second side plate;
   a second plate section, configured to be close to the second side plate in the longitudinal direction and extend in the vertical direction; and
   a connection section, configured to extend obliquely from the first side plate toward the second side plate and be connected to the first plate section and the second plate section, wherein the main body of the elastic thermal pad is deformed under an action of extrusion of the first side plate and the second side plate to absorb expansion forces of the first battery and/or the second battery,
   wherein the elastic thermal pad further comprises a compression portion disposed between and connected to one of the first extension portions and one end of the main body, the compression portion is formed as an arch structure and comprises: a third plate section, configured to extend in the vertical direction and be spaced from the first side plate and the second side plate in the longitudinal direction; a first extrusion section, configured to extend obliquely from the third plate section toward the first side plate and be connected to the third plate section and the main body; and a second extrusion section, configured to extend obliquely from the third plate section toward the first side plate and be connected to the third plate section and one of the first extension portions.

2. The temperature control assembly according to claim 1, wherein
   two ends of the elastic thermal pad in the vertical direction are respectively abutted against the corresponding first extension portion of the first side plate.

3. The temperature control assembly according to claim 1, wherein
   the compression portion is disposed so that when the first plate section and the second plate section of the main body are compressed by the first side plate and the second side plate in the longitudinal direction, the compression portion is compressed by the main body and deformed.

4. The temperature control assembly according to claim 1, wherein
   the elastic thermal pad further comprises a connecting portion, configured to be located between the compression portion and the first extension portion in the vertical direction and connected to the second extrusion section of the compression portion; and
   when the first plate section and the second plate section of the main body are compressed by the first side plate and the second side plate in the longitudinal direction, the connecting portion abuts against the first extension portion of the first side plate, and the first extension portion compresses the compression portion together with the main body via the connecting portion.

5. The temperature control assembly according to claim 1, wherein
   there is one elastic thermal pad.

6. The temperature control assembly according to claim 1, wherein
   there are at least two elastic thermal pads, and the at least two elastic thermal pads comprise a first elastic thermal pad and a second elastic thermal pad;
   the temperature control assembly further comprises a partition plate, configured to extend in the longitudinal direction and be connected to the first side plate and the second side plate; and
   the first elastic thermal pad is disposed above the partition plate, and the second elastic thermal pad is disposed below the partition plate.

7. A battery pack comprising a plurality of batteries and a temperature control assembly, wherein the plurality of batteries is arranged in a longitudinal direction of the temperature control assembly and comprises a first battery and a second battery, and the temperature control assembly is disposed between the first battery and the second battery, wherein the temperature control assembly comprises:

a first side plate abutting the first battery and directly facing a large surface of the first battery along the longitudinal direction, the first side plate comprises a first body, configured to extend in a vertical direction; and two first extension portions, each of the first extension portions is configured to be connected to one end of the first body and extend in the longitudinal direction;

a second side plate abutting the second battery and directly facing a large surface of the second battery along the longitudinal direction, wherein the second side plate is connected to the first side plate and forms a cavity together with the first side plate; and an elastic thermal pad, disposed in the cavity to divide the cavity into a plurality of passages, wherein the elastic thermal pad comprises a main body, and the main body comprises:

a first plate section, configured to be close to the first side plate in the longitudinal direction and extend in a vertical direction of the temperature control assembly;

a second plate section, configured to be close to the second side plate in the longitudinal direction and extend in the vertical direction; and a connection section, configured to extend obliquely from the first side plate toward the second side plate and be connected to the first plate section and the second plate section, wherein the main body of the elastic thermal pad is deformed under an action of extrusion of the first side plate and the second side plate to absorb expansion forces of the first battery and/or the second battery wherein the elastic thermal pad further comprises a compression portion disposed between and connected to one of the first extension portions and one end of the main body, the compression portion is formed as an arch structure and comprises: a third plate section, configured to extend in the vertical direction and be spaced from the first side plate and the second side plate in the longitudinal direction; a first extrusion section, configured to extend obliquely from the third plate section toward the first side plate and be connected to the third plate section and the main body; and a second extrusion section, configured to extend obliquely from the third plate section toward the first side plate and be connected to the third plate section and one of the first extension portions.

8. The apparatus according to claim 7, wherein the first plate section is in contact with the first side plate, and the second plate section is in contact with the second side plate.

9. An apparatus comprising a battery pack, wherein the battery pack is configured to provide electrical energy and the battery pack comprises a plurality of batteries and a temperature control assembly, wherein the plurality of batteries is arranged in a longitudinal direction of the temperature control assembly and comprises a first battery and a second battery, and the temperature control assembly is disposed between the first battery and the second battery, and the temperature control assembly comprises:

a first side plate abutting the first battery and directly facing a large surface of the first battery along the longitudinal direction, the first side plate comprises a first body, configured to extend in a vertical direction; and two first extension portions, each of the first extension portions is configured to be connected to one end of the first body and extend in the longitudinal direction;

a second side plate abutting the second battery and directly facing a large surface of the second battery along the longitudinal direction, wherein the second side plate is connected to the first side plate and forms a cavity together with the first side plate; and an elastic thermal pad, disposed in the cavity to divide the cavity into a plurality of passages, wherein the elastic thermal pad comprises a main body, and the main body comprises:

a first plate section, configured to be close to the first side plate in the longitudinal direction and extend in a vertical direction of the temperature control assembly;

a second plate section, configured to be close to the second side plate in the longitudinal direction and extend in the vertical direction; and a connection section, configured to extend obliquely from the first side plate toward the second side plate and be connected to the first plate section and the second plate section, wherein the main body of the elastic thermal pad is deformed under an action of extrusion of the first side plate and the second side plate to absorb expansion forces of the first battery and/or the second battery wherein the elastic thermal pad further comprises a compression portion disposed between and connected to one of the first extension portions and one end of the main body, the compression portion is formed as an arch structure and comprises: a third plate section, configured to extend in the vertical direction and be spaced from the first side plate and the second side plate in the longitudinal direction; a first extrusion section, configured to extend obliquely from the third plate section toward the first side plate and be connected to the third plate section and the main body; and a second extrusion section, configured to extend obliquely from the third plate section toward the first side plate and be connected to the third plate section and one of the first extension portions.

10. The battery pack according to claim 9, wherein the first plate section is in contact with the first side plate, and the second plate section is in contact with the second side plate.

11. The temperature control assembly according to claim 1, wherein the second side plate further comprises a second body configured to extend in the vertical direction; and two second extension portions, each of the second extension portions is configured to be connected to one end of the second body and extend in the longitudinal direction, where the second extension portions are connected to and abut against the first extension portions of the first side plate, respectively.

12. The battery pack according to claim 7, wherein the second side plate further comprises a second body configured to extend in the vertical direction; and two second extension portions, each of the second extension portions is configured to be connected to one end of the second body and extend in the longitudinal direction, where the second extension portions are connected to and abut against the first extension portions of the first side plate, respectively.

13. The battery pack according to claim 7, wherein
the compression portion is disposed so that when the first plate section and the second plate section of the main body are compressed by the first side plate and the second side plate in the longitudinal direction, the compression portion is compressed by the main body and deformed.

14. The battery pack according to claim 7, wherein
the elastic thermal pad further comprises a connecting portion, configured to be located between the compression portion and the first extension portion in the vertical direction and connected to the second extrusion section of the compression portion; and when the first plate section and the second plate section of the main body are compressed by the first side plate and the second side plate in the longitudinal direction, the connecting portion abuts against the first extension portion of the first side plate, and the first extension portion compresses the compression portion together with the main body via the connecting portion.

15. The apparatus according to claim 9, wherein the second side plate further comprises a second body configured to extend in the vertical direction; and two second extension portions, each of the second extension portions is configured to be connected to one end of the second body and extend in the longitudinal direction, where the second extension portions are connected to and abut against the first extension portions of the first side plate, respectively.

16. The apparatus according to claim 9, wherein,
the compression portion is disposed so that when the first plate section and the second plate section of the main body are compressed by the first side plate and the second side plate in the longitudinal direction, the compression portion is compressed by the main body and deformed.

17. The apparatus according to claim 9, wherein, the elastic thermal pad further comprises a connecting portion, configured to be located between the compression portion and one of the first extension portions in the vertical direction and connected to the second extrusion section of the compression portion; and when the first plate section and the second plate section of the main body are compressed by the first side plate and the second side plate in the longitudinal direction, the connecting portion abuts against one of the first extension portions of the first side plate, and one of the first extension portions compresses the compression portion together with the main body via the connecting portion.

* * * * *